Feb. 26, 1952  G. W. CRABTREE  2,587,443
HYDRAULIC SPRING-CONTROLLING DEVICE
Filed July 14, 1950  3 Sheets-Sheet 1
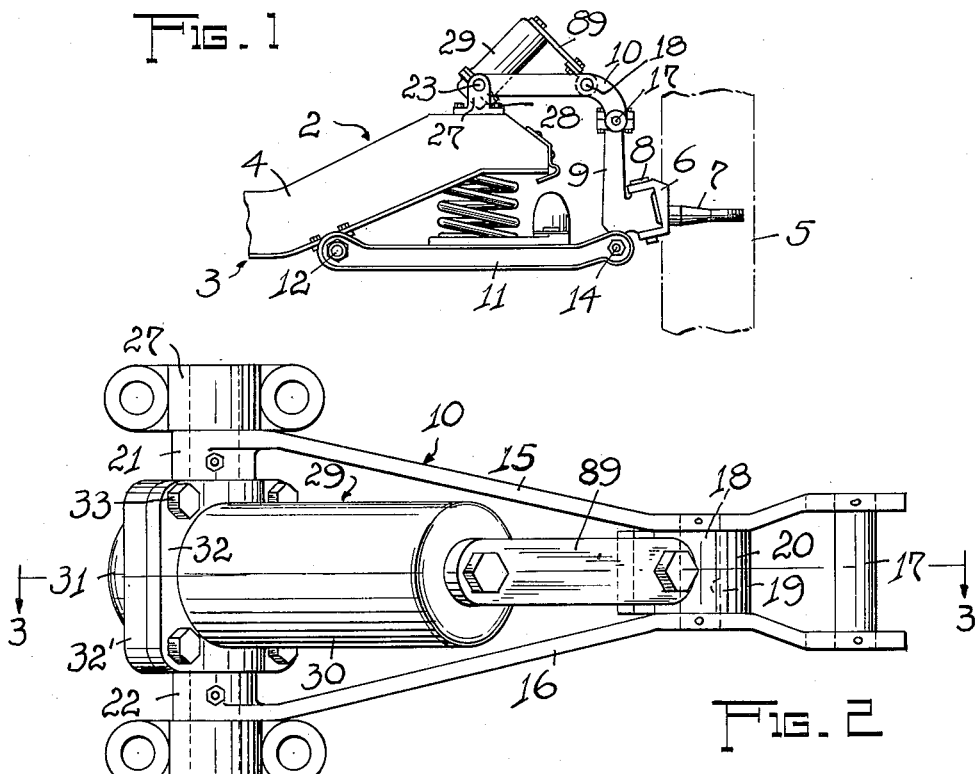
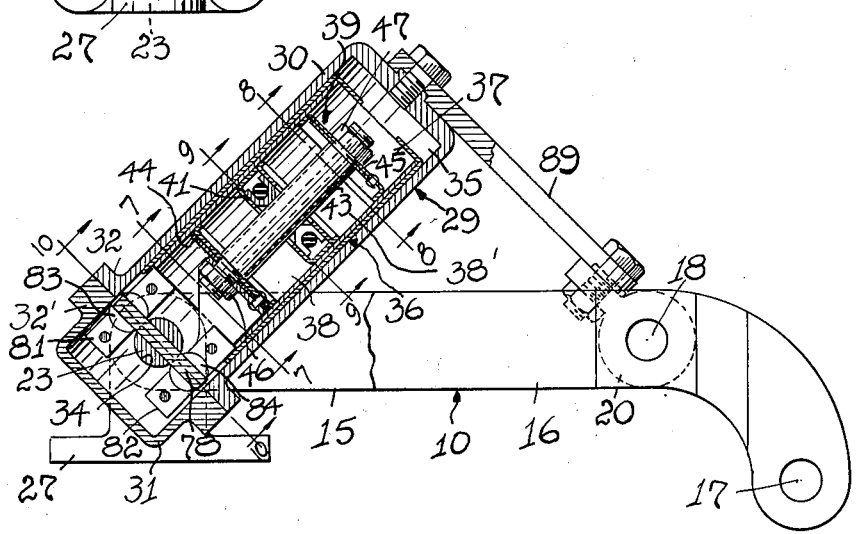
INVENTOR.
GEORGE W. CRABTREE
BY
Gustav Q. Wolff
ATT.

Feb. 26, 1952     G. W. CRABTREE     2,587,443
HYDRAULIC SPRING-CONTROLLING DEVICE

Filed July 14, 1950     3 Sheets-Sheet 2

INVENTOR.
GEORGE W. CRABTREE
BY
ATT

Feb. 26, 1952     G. W. CRABTREE     2,587,443
HYDRAULIC SPRING-CONTROLLING DEVICE
Filed July 14, 1950     3 Sheets-Sheet 3

INVENTOR.
GEORGE W. CRABTREE
BY
Gustav A. Wolff
ATT.

Patented Feb. 26, 1952

2,587,443

UNITED STATES PATENT OFFICE 2,587,443

HYDRAULIC SPRING-CONTROLLING
DEVICE

George W. Crabtree, Cleveland Heights, Ohio

Application July 14, 1950, Serial No. 173,708

13 Claims. (Cl. 267—20)

The present invention relates in general to double-acting hydraulic spring-controlling devices of the indirectly actuated type which check and retard movements of vehicle springs under compression and their reflex actions under rebound by forcible displacement of liquid from one end of a working chamber to its other end and vice versa, and is particularly adapted to be used in connection with automobile front wheel suspension means of the so-called knee action suspension type.

The general object of this invention is the provision of an improved, hydraulic, spring-controlling device of the type described above. The device including a pivotally supported, liquid filled housing, an open ended cylinder element slidably mounted in the housing and subdivided by passaged valve means in axially-aligned sections for restricted direct communication of the sections with each other, piston couple means for the cylinder element having pistons arranged in said sections to permit forcible displacement of liquid from one section through the passaged valve means into the other one and vice versa, and shifting means actuated by pivotal movement of the housing coupled with the cylinder element and piston couple to effect opposed reciprocatory movement of the cylinder element and piston couple with respect to each other when the housing is oscillated on its pivotal support.

Another object of the invention is the provision of an improved, hydraulic spring controlling device of the type described above in which one of the pistons includes valve means adapted to automatically effect replacing of liquid leaked from the space between the pistons of the piston couple.

A further object of the invention is the provision of an improved, hydraulic spring controlling device of the type described above in which the passaged valve means of the cylinder element includes a valve having coordinated passages of variable cross section controlled by the pressure actuating upon the valve to effect continuous, positive control of the checking or retarding action of the spring controlling device.

The above and additional objects and novel features of construction, combination and relation of parts by which the objects in view have been attained, will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 1 is a front elevational view showing a typical portion of an automobile front wheel supporting knee action type suspension arrangement, the upper control arm of which is coupled with a hydraulic spring controlling device constructed in accordance with the invention.

Fig. 2 is a plan view of the upper control arm with the hydraulic spring controlling device coupled thereto.

Fig. 3 is a sectional view partly in elevation on line 3—3 of Fig. 2.

Figure 4:
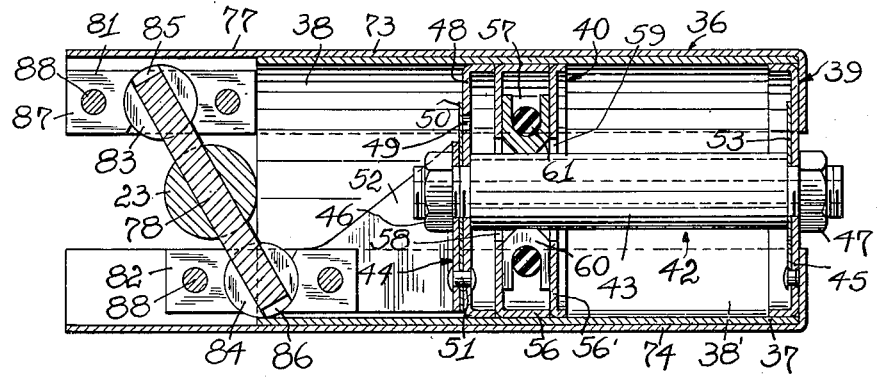
Fig. 4 is a longitudinal sectional view through the cylinder piston unit without the housing showing the cylinder and the piston couple shifted to a position in which substantially all the liquid has been displaced from the space at the left side of the passaged valve means to the right side thereof.

Referring now in detail to the exemplified form of the invention shown in the drawings, numeral 2 denotes a typical front portion of a motor vehicle chassis provided with a suitable frame structure 3 including a cross member 4, which connects the usual side rails (not shown) and projects laterally outwardly therefrom.

A typical front steerable ground wheel 5 is adapted to having rising and falling movements relative to the frame structure and independently of the remaining ground wheels of the vehicle by reason of the supporting and guiding mechanism comprising a steering knuckle 6 rotatably mounting the wheel 5 by the customary spindle 7. Steering knuckle 6 is swivelly connected by a king pin 8 with the generally vertically extending knuckle bracket support arm 9 having articulated or pivoted connections at its upper and lower ends, respectively, with the upper and lower laterally extending control arms 10 and 11.

The lower control arm 11, preferably of the wish-bone type, comprises a pair of arms, the inner ends of which are rigidly secured to each other by a shaft 12 and the outer ends of which at 14, as customary, have an articulated connection with the knuckle bracket support arm 9.

The upper control arm 10 consists of a pair of symmetrically arranged lever arms 15 and 16 which have their outer ends secured in spaced relation to each other by a pin 17 pivoted to knuckle bracket support arm 9, and are additionally connected with each other by a second pin 18 extended through a bore 19 in a spacer and attachment member 20. The inner ends of the symmetrically arranged lever arms 15, 16 diverge from each other and are formed with bearing portions 21, 22 pivoted to shaft 23 forming a part of the actuating means for the hydraulic spring controlling device, which shaft is formed by symmetrically constructed shaft sections 24 and 25 provided at their ends with serrations 26 to non-rotatably secure the shaft sections in brackets 27 attached to cross-member 4 by bolts 28.

Shaft 23 pivotally supports on its central portion between bearing portions 21 and 22 of upper control arm 10 a cylindrical housing 29 which is formed by two axially aligned, oppositely arranged, cylinder-like members 30, 31 having their opposed ends provided with flanges 32, 32' secured to each other by bolts 33. Housing 29 has arranged crosswise therethrough a bore 34 for shaft 23 to permit pivotal movement of the housing on said shaft. Housing 29 mounts in its cylindrical chamber 35 a cylinder piston type, spring-controlling unit 36 including an open ended cylinder member 37, a chambered ring-shaped member 40 subdividing member 37 into two axially aligned cylinder sections 38, 38' and a piston device 39. The ring-shaped member 40 is rigidly and fluid-tightly secured to the inner wall of cylinder member 37 which is slidably arranged in cylindrical chamber 35 and mounts a valve arrangement 41 (to be later described) permitting forcible displacement of liquid from one of the cylinder sections through member 37 into the other one of said cylinder sections, and vice versa.

Piston device 39 consists of a piston couple 42 embodying a grooved, tubular rod 43 which mounts on its opposite threaded ends pistons 44 and 45, nut members 46 and 47 being used for this purpose. Piston 44 consists of a flanged disk 48 which includes a passage 49 controlled by a stiff valve element 50 and has attached thereto by means of a rivet 51 and nut member 46 an extension member 52 of U-shaped cross section for a purpose later to be described. Piston 45 consists of a flanged disk 53 which includes passages 54 controlled by a soft valve element 55.

Piston couple 42 is dimensioned to position its pistons 44 and 45 in the two cylinder sections 38 and 38' so that grooved tubular rod 43 extends through the chambered ring-shaped member 40 and the valve arrangement 41 therein, all for the purpose of permitting in shock-absorbing operations axial movement of cylinder member 37 and piston couple 42 with respect to each other.

Chambered ring-shaped member 40, which with valve arrangement 41 affords controlled communication between cylinder sections 38, 38' consists of two ring-shaped flanged disks 56, 56' secured to each other, and forms together with tubular rod 43 a ring-shaped working chamber 57 when such tubular rod is extended through the circular central openings 58 and 59 in ring-shaped disks 56 and 56', respectively. This ring-shaped working chamber mounts the valve arrangement 41 consisting of a plurality of sector-like valve elements 60 which are yieldingly held in proper position with respect to each other by a rubber ring 61 encircling valve arrangement 41. This construction of the valve arrangement permits its differential opening against the tension of rubber ring 61, when in operation of the spring controlling unit, liquid is forced by piston 44 and 45 from cylinder section 38 or 38' through valve arrangement 41 into cylinder section 38' or 38. In such a case liquid under pressure forces the individual valve elements 60 outwardly against the tension of rubber ring 61 outwardly and increases the cross section of the liquid passing area of the valve arrangement 41. A decrease in the pressure of the liquid adjacent to member 40 reduces the cross section of the liquid passing area of valve arrangement 41 as rubber ring 61 tends to shift valve elements 60 inwardly so as to close the cross section of the liquid passing area of the valve arrangement.

The valve elements 60 are shifted when in reciprocatory movements of the piston couple and cylinder with respect to each other, liquid under pressure acts on either side of these elements permitting in spring-controlling operations proper control of both the compression and the reflex stresses of vehicle springs. All valve elements are identical in construction, each element embodying a ring sector body 62 having flat top and bottom faces 63 and 64 and flat end faces 65 and 66 angularly related to each other in planes intersecting the axis of the ring body of valve arrangement 41 formed by the valve elements 60. Each valve element has arranged in its outer curved wall a channel 67 for properly seating the rubber ring 61 which yieldingly holds these valve elements in proper relation with respect to each other. In addition, each valve element includes inwardly inclined wall portions 68 and 69, wall portion 68 extending from the top face 63 toward the inner wall 70 of the valve element and wall portion 69 extending from the bottom face 64 toward such wall 70. The inclination of wall portions 68 and 69 and their area determines the force effecting shifting of the valve elements against the yielding force of rubber ring 61 by liquid pressure against the valve elements and, therefore, such inclination and area of wall portions 68 and 69 affords a simple means to properly size the liquid passage area of the valve arrangement for all practical purposes. Preferably, as shown, tubular rod 43 has arranged in its peripheral wall elongated recesses 71 to permit dispensing of small amounts of liquid between cylinder sections 38 and 38' without opening up of valve arrangement 41. The inclined wall portions 68 and 69 are preferably differentially inclined and differentially sized to provide the desired ratio of force necessary for properly controlling both the compression and reflex stresses of vehicle springs.

The slidably mounted open ended cylinder member 37 has for such purpose rigidly secured to its peripheral wall oppositely arranged, elongated, curved sheet metal members 73 and 74 which guide the cylinder member during its reciprocatory movements in housing chamber 35 and provide between the peripheral wall of the cylinder member and the wall of housing chamber 35 elongated liquid passages 75, 76 permitting open communication between the open ends of the cylinder member for a purpose later to be described. The sheet metal member 74, which is arranged adjacent to extension member 52 and substantially longer than cylinder member 37 is forwardly extended from member 37 and has its extended portion 77 bent to U-shaped cross section similar to the cross section of extension member 52.

The cylinder member 37 and the piston couple 42 are axially shifted in opposite directions with respect to each other by rocking movements of housing 29 on shaft 23. Thus, shaft 23 has extended therethrough an actuating member 78 held in the slotted end portions 79, 80 of the shaft sections 24 and 25 (preferably welded together to form a more rigid shaft 23) and slidably engaged with bearing blocks 81, 82 which axially rotatably mount slotted shoes 83, 84, the slots 85, 86 of which have actuating member 78 slidably extended therethrough. Bearing blocks 81 and 82 are assembled from symmetrically constructed halves 87 secured by rivets 88 to each other and the extension member 52 and the extended portion 77 of sheet metal member 73, respectively, so that rocking movements of housing 29 on shaft 23 effects axial shifting of cylinder member 37 and piston couple 42 in opposite directions with respect to each other.

The diametrically opposed position of bearing blocks 81, 82 with respect to shaft 23 effects simultaneous shifting of cylinder member 37 and piston couple 42 in opposite directions with respect to each other when housing 29 of the spring-controlling device and upper control arm 10 coupled with housing 29 by a link 89 are jointly rocked on shaft 23.

Housing 29 and cylinder 37 of the spring-controlling unit are filled with a suitable liquid so that the spring-controlling unit 36 is arranged in a completely liquid-filled housing.

Figure 5:
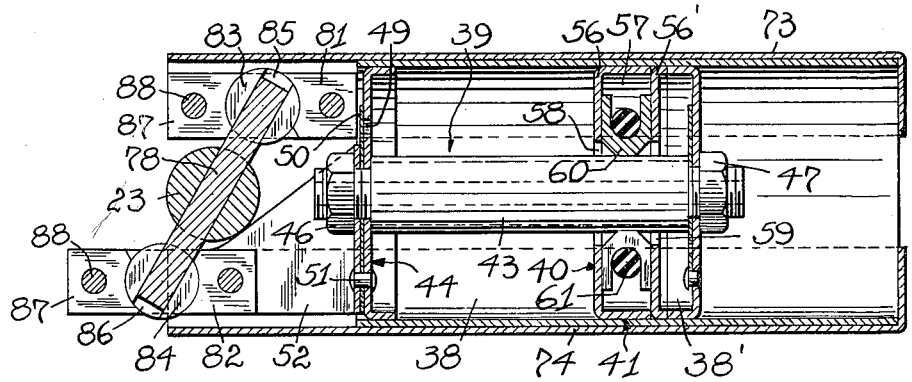
Fig. 5 is a view similar to Fig. 4 showing the cylinder and the piston couple shifted to a position in which substantially all the liquid has been displaced from the space at the right side of the passaged valve means to the left side thereof.
Figure 6:
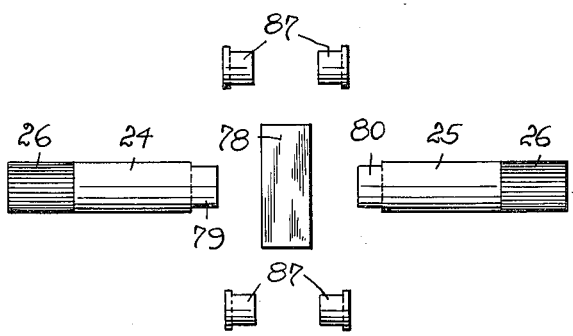
Fig. 6 is a view showing the shifting means for the cylinder piston unit in disassembled relative position with respect to each other.
Figure 7:
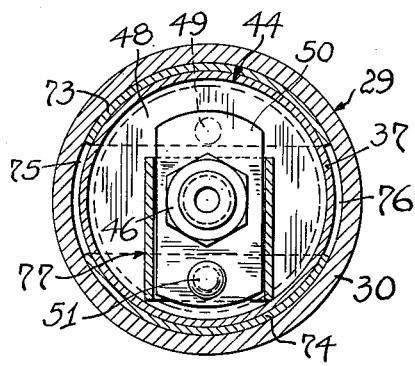
Fig. 7 is a cross-sectional view through the cylinder piston unit, the section being taken on line 7—7 of Fig. 3.
Figure 8:
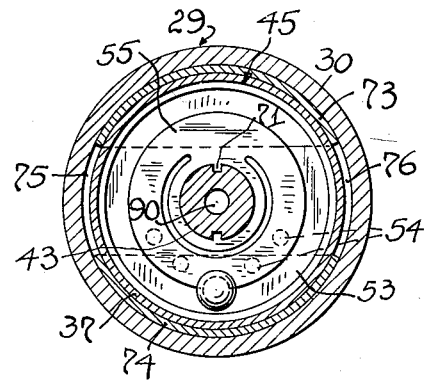
Fig. 8 is a cross-sectional view on line 8—8 of Fig. 3.
Figure 9:
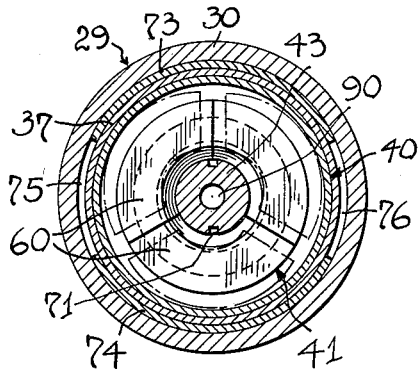
Fig. 9 is a cross-sectional view on line 9—9 of Fig. 3.
Figure 10:
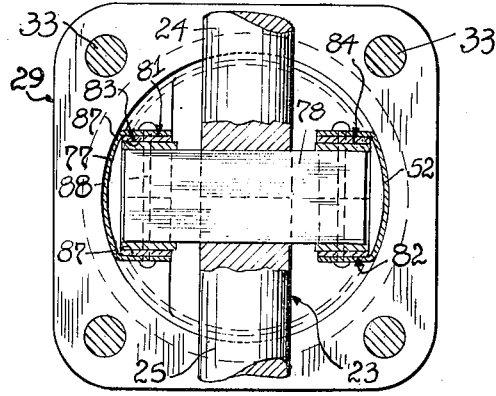
Fig. 10 is a cross-sectional view on line 10—10 of Fig. 3.
Figure 11:
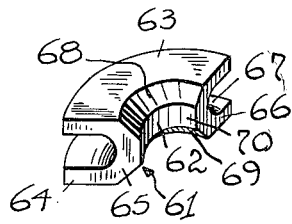
Fig. 11 is a perspective view of one of the valve elements of the valve member of the passaged valve means.

When attached to an automobile the device has its housing 29 pivotally supported on the shaft 23 and linked to the upper control arm of the wheel supporting and guiding mechanism to effect oscillatory movements of the housing and therewith actuation of the spring-controlling unit 36 when, in springing action between body and chassis upper control arm is oscillated. The oscillating movements of housing 29 are transformed to reciprocatory movements of cylinder 37 and piston couple 42 which reciprocate in opposite directions with respect to each other, and these reciprocating movements displace the liquid from one cylinder section through the passaged valve means into the other cylinder section and vice versa. Thus, when the piston couple 42 travels toward the right and the cylinder 37 toward the left (see Fig. 4) piston 44 forcibly shifts the liquid between the pistons 44 and 45 of the piston couple from a space between piston 44 and ring-shaped member 40 through the valve arrangement 41 into a space between ring-shaped member 40 and piston 45, and piston 45 effects unimpeded transfer of liquid from a space in cylinder section 38' adjacent to piston 45 of the piston couple through axial passage 90 in tubular rod 43 and elongated passages 75 and 76 into the space of cylinder section 38 adjacent to piston 44. When the piston couple travels toward the left and cylinder 37 toward the right (see Fig. 5) piston 45 forcibly shifts the liquid between the pistons 44 and 45 of the piston couple from a space between piston 45 and ring-shaped member 40 through the valve arrangement 41 into a space between ring-shaped member 40 and piston 44, and piston 44 effects unimpeded transfer of liquid from a space in cylinder section 38 adjacent to piston 44 of the piston couple through axial passage 90 in tubular rod 43 and elongated passages 75 and 76 into a space of cylinder section 38' adjacent to piston 45 of the piston couple.

A hydraulic spring-controlling unit of the type described practically eliminates leakage of liquid as liquid under pressure is present only in the inner portions of the cylinder sections, that is, between the pistons and the passaged valve means, whereas the liquid in the outer portions of the cylinder sections and the housing is under atmospheric pressure and readily and unimpededly displaceable from the one outer portions of the cylinder sections to the other ones and vice versa.

Excessive pressure due to thermal expansion of the liquid in the device is eliminated by valve controlled passage 49 in piston 44, which passage is closed by the valve disk or element 50 having sufficient inherent stiffness to prohibit, under normal conditions, escape of liquid from the cylinder section 38. Leakage of liquid from the inner portions of the cylinder sections is counteracted by valve controlled passages 54 which are normally closed by valve disk or element 55 designed to readily permit communication of the inner portion of cylinder section 38' with the other portion thereof so as to automatically keep the cylinder section properly filled with liquid necessary for proper action of the hydraulic spring-controlling device, when the piston couple travels toward the right.

Having thus described my invention what I claim is:

1. A hydraulic spring-controlling device comprising a housing, a shaft member pivotally supporting said housing, and a hydraulic double-acting, spring-controlling unit in said housing coupled with said shaft member, said unit including an open-ended cylinder member axially shiftably guided in said housing, ring-shaped valve means in said cylinder member subdividing same into axially aligned cylinder sections, a piston couple including pistons arranged in both said cylinder sections and connected with each other by a connecting rod extended through said ring-shaped valve means, and opposed lever means on said shaft member coupled with said cylinder member and piston couple, said lever means adapted to effect reciprocating movement of said cylinder member and piston couple in opposite directions with respect to each other when the housing is oscillated on said shaft.

2. A hydraulic spring-controlling device as described in claim 1, wherein guide members are provided to guide the cylinder member of said spring-controlling unit in localized areas of said housing, and wherein said housing, said guide members and said cylinder member are arranged to jointly form passage means effecting open communication between the opposite ends of said cylinder member.

3. A hydraulic spring-controlling device as described in claim 1, wherein guide members are provided to guide the cylinder member of said spring-controlling unit in localized areas of said housing, wherein said housing, said guide members and said cylinder member are arranged to jointly form passage means effecting open communication between the opposite ends of said cylinder member, and wherein the connecting rod of the piston couple is tubular to provide a second passage means effecting open communication between the end portions of said cylinder member.

4. A hydraulic spring-controlling device comprising a housing, a shaft member pivotally supporting said housing, and a hydraulic double-acting, spring-controlling unit in said housing coupled with said shaft member, said unit including a cylinder member open at its opposite ends, guide means axially shiftably guiding said cylinder in said housing in circumferentially spaced areas and forming communicating passages between said housing and said cylinder for free communication of the open ends of said cylinder member with each other, ring-shaped valve means in said cylinder member subdividing same with axially aligned cylinder sections, a piston couple including pistons arranged in both said cylinder sections and connected with each other by a connecting rod extended through said ring-shaped valve means, and diametrically opposed lever means on said shaft member coupled with said cylinder member and piston couple, said lever means adapted to effect reciprocatory movements of said cylinder member and piston couple in opposite directions with respect to each other when the housing is oscillated on said shaft.

5. A hydraulic spring-controlling device as described in claim 4, wherein said cylinder member and said piston couple include extension means pivotally and slidably coupled with said diametrically opposed lever means.

6. A hydraulic spring-controlling device as described in claim 4, wherein said cylinder member and said piston couple include extension means, wherein said extension means mount axially rotatably arranged coupling blocks, and wherein said coupling blocks are slidably coupled with said diametrically opposed lever means.

7. A hydraulic spring-controlling device as described in claim 4, wherein said cylinder member and said piston couple include extension means arranged in diametrically opposed position with respect to each other, wherein said extension means mount axially rotatably arranged coupling blocks and wherein said coupling blocks are slidably coupled with said diametrically opposed lever means.

8. A hydraulic spring-controlling device as described in claim 4, wherein said ring-shaped valve means includes a ring-shaped valve housing, and a ring-shaped valve assembly in said housing embodying a plurality of individual, shiftable, cooperating, sector-like valve sections arranged circumferentially with respect to each other, and means yieldingly contracting said valve sections about the connecting rod of said piston couple.

9. A hydraulic spring-controlling device as described in claim 8, wherein said sector-like valve sections include inclined surface portions adapted to effect, under liquid pressure, controlled shifting of said valve sections against the force of the yielding means which tends to contract said valve sections about the connecting rod of said piston couple.

10. A hydraulic spring-controlling device as described in claim 8, wherein said sector-like valve sections have top and bottom faces perpendicularly arranged to the axis of said cylinder member and wherein both the top and bottom faces have arranged therein inclined surface portions adapted to effect under liquid pressure shifting of said valve sections against the force of the yielding means contracting said valve sections about the connecting rod of said piston couple.

11. A hydraulic spring-controlling device as described in claim 8, wherein the sector-like valve sections of the ring-shaped valve assembly have top and bottom faces rectangularly related to the axis of said cylinder member, wherein said top and bottom faces include inclined surface portions, and wherein the angle of inclination of the inclined top surface portion differentiates from the angle of inclination of the inclined bottom surface portion.

12. A hydraulic spring-controlling device of the type described in claim 11, wherein said cylinder member mounts on its peripheral wall elongated guide members fitting said housing and adapted to axially guide said cylinder in said housing, said guide members extending over the entire length of the cylinder member and being laterally spaced with respect to each other to form between adjacent guide members the said elongated passages.

13. The combination of an automobile front wheel suspension means of the knee action suspension type having an upper control arm assembled from spaced symmetrically arranged lever arms and pivoted on a shaft secured to the frame structure of the automobile with a hydraulic spring-controlling device having a housing pivoted on said shaft between said levers, link means connecting said housing to said levers, and a double-acting spring-controlling unit arranged in said housing, said unit including cylinder means axially shiftably guided in said housing, piston means shiftably arranged in said cylinder means, two oppositely arranged lever means on said shaft means, and means coupling one of said lever means with said cylinder means and the other one of said lever means with said piston means to effect reciprocatory movements of said cylinder means and piston means in opposite directions with respect to each other when said housing is oscillated on said shaft.

GEORGE W. CRABTREE.

REFERENCES CITED

The following references are of record in the file of this patent:

UNITED STATES PATENTS

| Number | Name | Date |
|---|---|---|
| 1,621,039 | Landis | May 31, 1927 |
| 1,797,751 | Berry | Mar. 24, 1931 |
| 1,967,169 | Armstrong | July 17, 1934 |
| 2,153,083 | Griswold | Apr. 4, 1939 |
| 2,165,332 | Best | July 11, 1939 |
| 2,533,226 | Davis et al. | Dec. 12, 1950 |